United States Patent
Roach et al.

(10) Patent No.: US 8,090,850 B2
(45) Date of Patent: Jan. 3, 2012

(54) METHODS, SYSTEMS, AND COMPUTER READABLE MEDIA FOR REGULATING NETWORK ADDRESS TRANSLATOR (NAT) AND FIREWALL PINHOLE PRESERVATION TRAFFIC IN A SESSION INITIATION PROTOCOL (SIP) NETWORK

(75) Inventors: Adam B. Roach, Dallas, TX (US); Ben Allen Campbell, Irving, TX (US); Robert J Sparks, Plano, TX (US); Ajay P. Deo, Lewisville, TX (US)

(73) Assignee: Tekelec, Morrisville, NC (US)

( * ) Notice: Subject to any disclaimer, the term of this patent is extended or adjusted under 35 U.S.C. 154(b) by 209 days.

(21) Appl. No.: 12/637,587

(22) Filed: Dec. 14, 2009

(65) Prior Publication Data
US 2010/0161809 A1 Jun. 24, 2010

(51) Int. Cl.
*G06F 15/16* (2006.01)
(52) U.S. Cl. ........ 709/228; 709/227; 709/229; 709/230; 709/232; 709/233; 709/234; 709/235
(58) Field of Classification Search .......... 709/227–229, 709/230, 232–235
See application file for complete search history.

(56) References Cited

U.S. PATENT DOCUMENTS

| | | | |
|---|---|---|---|
| 5,179,554 A | 1/1993 | Lomicka et al. | |
| 6,581,063 B1 | 6/2003 | Kirkman | |
| 6,816,903 B1* | 11/2004 | Rakoshitz et al. | 709/226 |
| 7,417,981 B2 | 8/2008 | Holder et al. | |
| 7,903,672 B1* | 3/2011 | deRuijter et al. | 370/401 |
| 2004/0024879 A1* | 2/2004 | Dingman et al. | 709/227 |
| 2004/0128554 A1 | 7/2004 | Maher et al. | |
| 2005/0039051 A1* | 2/2005 | Erofeev | 713/201 |
| 2006/0085548 A1 | 4/2006 | Maher, III et al. | |
| 2006/0123119 A1* | 6/2006 | Hill et al. | 709/227 |
| 2007/0094412 A1 | 4/2007 | Sollee | |
| 2007/0112965 A1* | 5/2007 | Eftis et al. | 709/227 |
| 2007/0124813 A1* | 5/2007 | Ormazabal et al. | 726/11 |
| 2007/0211705 A1* | 9/2007 | Sunstrum | 370/356 |

(Continued)

FOREIGN PATENT DOCUMENTS
WO WO 2010/068949 A2 6/2010

OTHER PUBLICATIONS eMultimedia, "Registration in SIP," http://www.siptutorial.net/SIP/registration.html (copyright 2005) (downloaded from the Internet on Oct. 22, 2009).

(Continued)

*Primary Examiner* — Hieu Hoang
(74) *Attorney, Agent, or Firm* — Jenkins, Wilson, Taylor & Hunt, P.A.

(57) ABSTRACT

Methods, systems, and computer readable media for regulating pinhole preservation traffic generated or received by firewall or network address translator (NAT) session initiation protocol (SIP) user agent clients (UACs) are disclosed. One method includes, maintaining a list of contact information for a plurality of SIP UACs registering from behind at least one of a firewall and a NAT. The method further includes iterating through the list to generate SIP messages to the different UACs such that the SIP messages to the different UACs are spaced at substantially regular intervals with respect to each other, wherein the SIP messages to the different UACs trigger responses from the UACs such that the responses are spaced at substantially regular intervals with respect each other.

14 Claims, 9 Drawing Sheets

U.S. PATENT DOCUMENTS

| | | | |
|---|---|---|---|
| 2009/0083845 A1* | 3/2009 | Ormazabal et al. | 726/11 |
| 2009/0175282 A1* | 7/2009 | Babin et al. | 370/401 |
| 2009/0222575 A1* | 9/2009 | Goodman | 709/238 |
| 2010/0136970 A1* | 6/2010 | Mui et al. | 455/435.1 |
| 2010/0325306 A1* | 12/2010 | Vimpari et al. | 709/233 |

OTHER PUBLICATIONS

Notification of Transmittal of the International Search Report and the Written Opinion of the International Searching Authority, or the Declaration for International Application No. PCT/US2009/067926 (Jul. 28, 2010).

Froment et al., "Addressing Record-Route Issues in the Session Initiation Protocol (SIP)," Network Working Group, draft-ietf-sip-record-route-fix-05 (Aug. 14, 2009).

Jennings et al., "Managing Client Initiated Connections in the Session Initiation Protocol (SIP)," Network Working Group, draft-ietf-sip-outbound-16 (Oct. 29, 2008).

Rosenberg et al., "Traversal Using Relays around NAT (TURN): Relay Extensions to Session Traversal Utilities for NAT (STUN)," Internet-Draft, draft-ietf-behave-turn-10 (Sep. 29, 2008).

Hilt et al., "A Framework for Session Initiation Protocol (SIP) Session Policies," SIPPING Working Group, draft-ietf-sip-session-policy-framework-04 (Aug. 22, 2008).

Petrie et al., "A Framework for Session Initiation Protocol User Agent Profile Delivery," SIPPING Internet-Draft, draft-ietf-sipping-config-framework-15 (Feb. 13, 2008).

Willis et al., "Session Initiation Protocol (SIP) Extension Header Field for Service Route Discovery During Registration," Network Working Group, RFC 3608 (Oct. 2003).

Rosenberg et al., "An Extension to the Session Initiation Protocol (SIP) for Symmetric Response Routing," Network Working Group, RFC 3581 (Aug. 2003).

Willis et al., "Session Initiation Protocol (SIP) Extension Header Field," Network Working Group, RFC 3327 (Dec. 2002).

Schulzrinne, "Dynamic Host Configuration Protocol (DHCP-for-IPv4) Option for Session Initiation Protocol (SIP) Servers," Network Working Group, RFC 3361 (Aug. 2002).

Rosenberg et al., "Session Initiation Protocol (SIP): Locating SIP Servers," Network Working Group, RFC 3263 (Jun. 2002).

Hardie, "Distributing Authoritative Name Servers via Shared Unicast Addresses," Network Working Group, RFC 3258 (Apr. 2002).

\* cited by examiner

| SOURCE IP ADDRESS | PORT |
|---|---|
| SOURCE IP ADDRESS | PORT |
| SOURCE IP ADDRESS | PORT |
| SOURCE IP ADDRESS | PORT |
| SOURCE IP ADDRESS | PORT |

FIG. 9

METHODS, SYSTEMS, AND COMPUTER READABLE MEDIA FOR REGULATING NETWORK ADDRESS TRANSLATOR (NAT) AND FIREWALL PINHOLE PRESERVATION TRAFFIC IN A SESSION INITIATION PROTOCOL (SIP) NETWORK

PRIORITY CLAIM

This application claims the benefit of U.S. Provisional Patent Application Ser. No. 61/122,261, filed Dec. 12, 2008; the disclosure of which is incorporated herein by reference in its entirety.

TECHNICAL FIELD

The subject matter described herein relates to NAT and firewall traversal in a SIP network. More specifically, the subject matter relates to methods, systems, and computer, readable media for regulating NAT and firewall pinhole preservation traffic in a SIP network.

BACKGROUND

Various forms of media communications, including voice and multimedia communications, can be transmitted over a packet-based network. Because packet-based networks lack dedicated circuits for such communications and because end user devices have different capabilities, signaling protocols are used to establish the media communications sessions. One such signaling protocol for establishing voice and multimedia communication sessions over packet-based network is the Session Initiation Protocol (SIP) as developed by the Internet Engineering Task Force (IETF). SIP and other signaling protocols are used for negotiating session information to coordinate the establishment of a call session between SIP clients. Once communication setup signaling has been completed, packetized media, including voice and other real time data, can flow between the endpoints. A media transport protocol, such as the Real-Time Transport Protocol (RTP), can be used for conveying packetized media between the endpoints.

Some issues involving SIP communication are caused by the use of firewalls and/or network address translator (NAT) devices interposed between SIP entities. One issue is that a firewall does not allow unsolicited connections from a system or device outside a private network to nodes or devices in the private network. Similarly, NATs do not provide external visibility to terminals behind NATs. One way to solve such problems includes the use of pinholes. A pinhole is a port that is opened through a firewall or a NAT to allow a particular application or system access to a protected network or system. As may be expected, pinholes can expose a protected system to external attacks. It is therefore common in many implementations of firewalls and or NATs to automatically close pinholes after a period of non-use to minimize the security exposure.

One problem with pinholes in SIP networks is that a pinhole in a firewall opened in response to a SIP registration may close before the pinhole is refreshed by re-registration or other means. In SIP networks, the registration process involves a SIP terminal sending a register message to a SIP registrar informing the registrar of the terminal's current contact address. The SIP registrar responds with a SIP 200 OK message that includes an expire field that contains the duration for which the registration is valid. To maintain the registration, the SIP terminal may repeatedly send register messages within the expire or timeout period to keep the registration active.

If the SIP terminal is located behind a firewall, outgoing messages from the SIP terminal, such as the register messages, open a pinhole in the firewall. The pinhole is typically closed by the firewall if the pinhole is not used within a predetermined time period. If the SIP registration timeout is greater than the firewall pinhole timeout and no other messages are sent by the terminal, the pinhole will be closed, making the terminal unreachable.

Accordingly, it may desirable to trigger the user agent or terminal to refresh the firewall pinhole within the firewall pinhole timeout period. Any solution to the issue of maintaining firewall pinholes is preferably scalable and efficient from the point of view of the node that triggers the terminal to keep the pinhole open. For example, if all user terminals behind the same NAT or firewall are triggered to refresh their respective pinholes within a short time period of each other or without considering the collective effect of pinhole preservation traffic, then the result may be congestion or failure of a SIP node. If all of the SIP terminals reregister or refresh their pinholes at the same time, the burstiness and the traffic could overwhelm a SIP node. In addition, solutions which require the pinhole-refresh-triggering node to maintain the same registration state that is maintained by a SIP registrar are not scalable or suitable for geodiversity.

Accordingly, in light of these difficulties, there exists a need for improve methods, systems, and computer readable media for regulating NAT and firewall pinhole preservation traffic in a SIP network.

SUMMARY

The subject matter described herein relates to methods, systems, and computer readable media for regulating NAT and firewall pinhole preservation traffic in a SIP network. One method includes, maintaining a list of contact information for a plurality of SIP UACs registering from behind at least one of a firewall and a NAT. The method further includes iterating through the list to generate and send SIP messages to the different UACs such that the SIP messages to the different UACs are spaced at substantially regular intervals with respect to each other, wherein the SIP messages to the different UACs trigger responses from the UACs such that the responses are spaced at substantially regular intervals with respect each other.

The subject matter described herein for regulating pinhole preservation traffic can be implemented using a computer readable medium having stored thereon instructions that when executed by a processor of a computer control the computer to perform steps. Exemplary computer readable media suitable for implementing the subject matter described herein include chip memory devices or disk memory devices accessible by a processor, programmable logic devices, and application specific integrated circuits. The computer readable medium may be a non-transitory medium. In one exemplary implementation, a SIP proxy that implements the subject matter described herein may include one or more processors that have access to the computer readable medium that stores the computer executable instructions for implementing the subject matter described herein. In addition, a computer readable medium that implements the subject matter described herein may be implemented on a single device or computing platform or may be distributed across plural devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
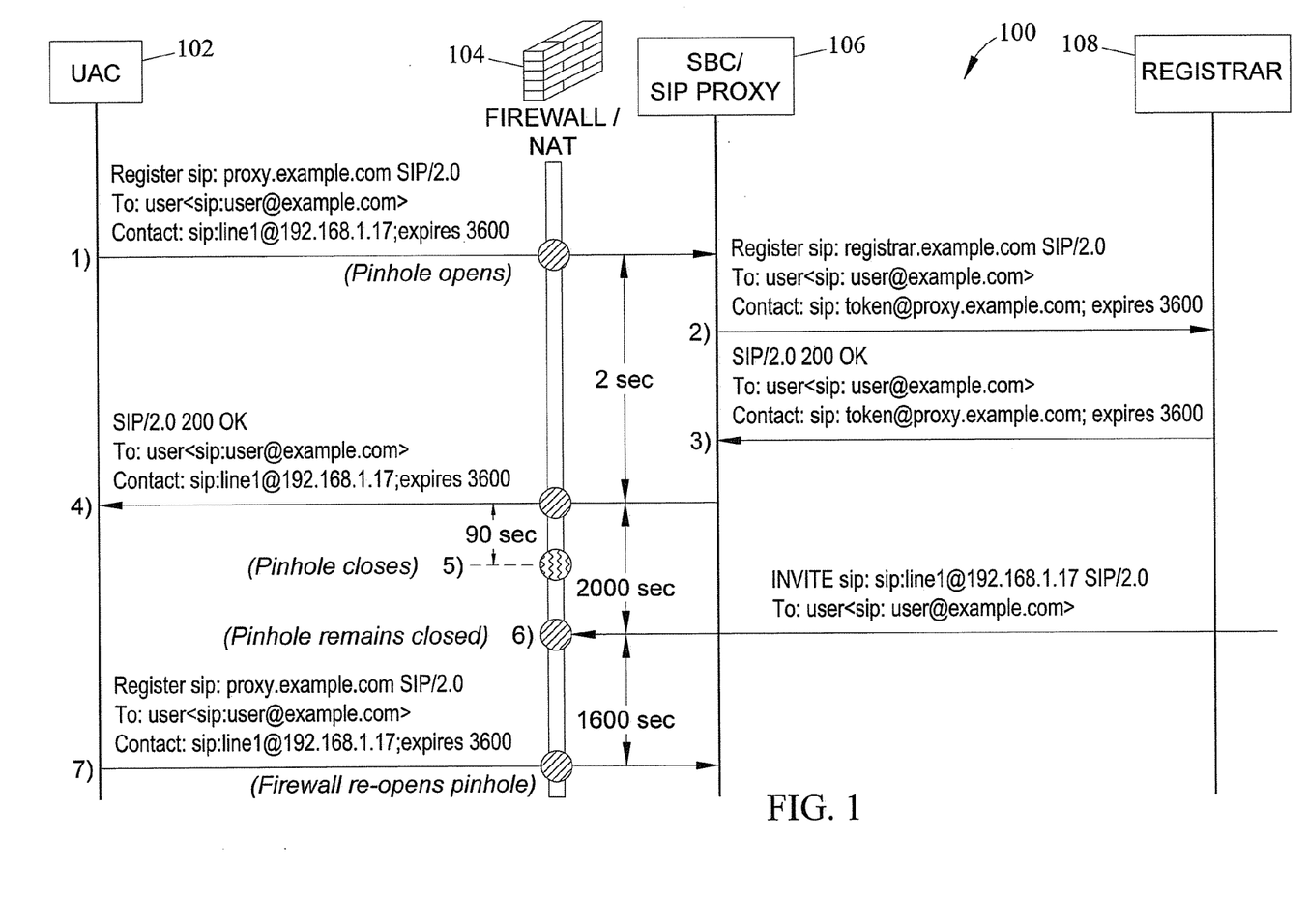
FIG. 1 is a message flow diagram illustrating a SIP communications problem involving a UAC located behind a firewall and or NAT.

The subject matter described herein includes methods, systems, and computer readable media for regulating pinhole preservation message traffic in a session initiation protocol (SIP) network. In one example, pinhole preservation may be necessary when a SIP user agent client (UAC) is behind a firewall and or a network address translator (NAT). FIG. 1 is a message flow diagram 100 illustrating a SIP communications problem involving a UAC located behind a firewall and/or a NAT. As shown, a SIP user agent client (UAC) 102 located behind a firewall and or NAT (firewall/NAT) 104 may desire to register its contact information with a SIP registrar 108. The network in which registrar 108 resides may include a SIP entity 106, such as a session border controller (SBC) and/or a SIP proxy 106. SIP entity 106 may include any type SIP entity capable of sending or receiving SIP messages, including a SIP proxy, an SBC, or other types of back-to-back user agents. Further, while other SIP entities are not depicted it should be understood that additional SIP proxies and or SBCs may exist in the network and further one or more of these additional nodes may form a cluster with SIP entity 106. For example, SIP entity 106 and another SIP entity may operate as active-standby entities for each other or may function in a load sharing manner. In one exemplary embodiment, SIP entity 106 may function as an active SIP proxy/SBC and may be paired with a geodiverse standby SIP proxy/SBC.

Referring to line 1 of message flow diagram 100, user agent client 102 sends a SIP register message to SIP entity 106. The SIP register message includes the address of record of the user agent and a contact header that specifies an address at which the user agent client desires to be contacted for this registration context. The SIP Register message may also include an "expiration" parameter value that specifies the duration of the requested SIP network registration. In the register message, UAC 102 specifies a registration duration value of 3600 seconds (i.e., one hour) via the "expires" parameter in the Contact header field.

As shown, sending the SIP register message opens a pinhole in the firewall/NAT 104 interposed between the UAC 102 and SIP entity 106. Pinholes are points or ports in firewall/NAT 104 that allow connections or access by an outside device or system to certain programs, devices, or systems behind the firewall/NAT 104. Pinholes may be associated with a source IP address and port from which the register message was sent or where a response may be received (e.g., the IP address and port to reach UAC 102). In line 2 of message flow diagram 100, SIP entity 106 sends the registration message on behalf of the UAC 102 to registrar 108. That is, SIP entity 106 modifies the registration message so that the contact information is associated with SIP entity 106 and forwards the modified message to registrar 108.

In line 3 of message flow diagram 100, registrar 108 responds to UAC 102 by sending a 200 OK message to SIP entity 106. The 200 OK message may include a registration duration value as shown by the "expires" parameter in the Contact header field. The 200 OK message duration value may be the same as the original duration request of UAC 102. In line 4 of message flow diagram 100, SIP entity 106 modifies the message and forwards the modified message to UAC 102. As shown, the modified message includes the same "expires" parameter value as provided by registrar 108.

In many firewall/NAT implementations, pinholes which are opened as a result of a message sourced by a UAC are only maintained open by a firewall/NAT for a relatively short period of time (e.g., a few seconds or minutes) in the absence of any ingress or egress traffic. If no inbound or outbound traffic is detected at the pinhole by the firewall/NAT prior to a predetermined (and typically short) timeout period, the device closes the pinhole.

Referring to line 5 of message flow diagram 100, after 90 seconds of no traffic through the pinhole, firewall/NAT 104 closes the pinhole. This can be problematic for SIP network operations in some circumstances because even those UAC 102 is registered for a longer duration, if a pinhole is used in SIP communications and has a shorter duration, SIP messages are prevented from reaching UAC 102. In line 6 of message flow diagram 100, 2002 seconds after the original SIP register message was sent by UAC 102 and after UAC 102 has been registered with registrar 108, a call setup attempt message or SIP INVITE message for the UAC reaches the firewall. Since the pinhole has "timed out" and is now closed, the SIP INVITE message is not allowed to traverse the firewall, and call setup to the UAC 102 cannot be accomplished. In line 7 of message flow diagram 100, UAC 102 sends another register message after the registration duration expires.

Figure 2:
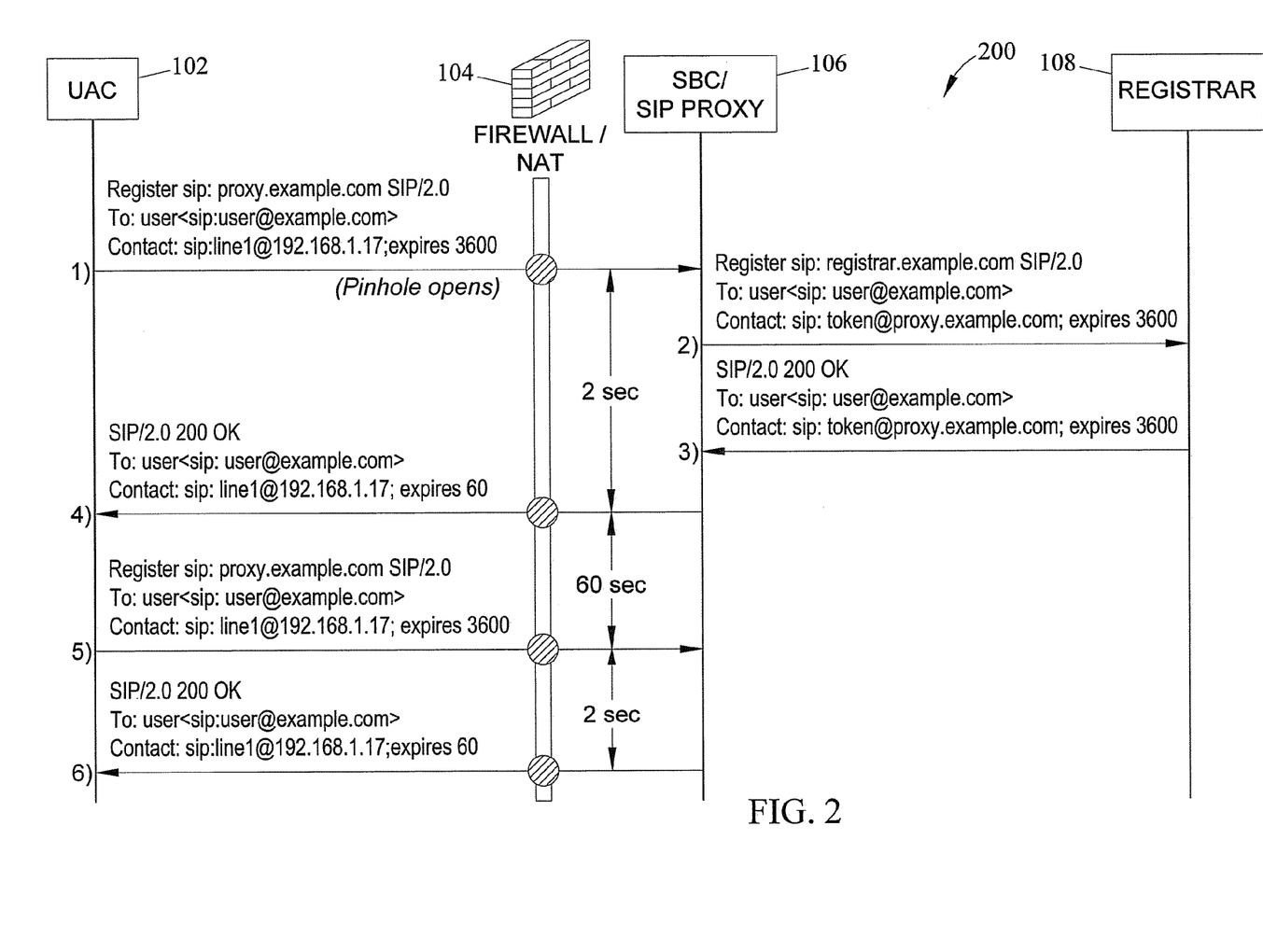
FIG. 2 is a message flow diagram illustrating one possible pinhole preservation technique.

As shown by FIG. 1, it is important for pinholes associated with SIP communications to stay open or active as long as UAC 102 expects or wants to receive SIP messages (e.g., as long as UAC 102 is registered with registrar 108). As such, it may be necessary to preserve pinholes to allow such communications to be received. FIG. 2 is a message flow diagram 200 illustrating one possible pinhole preservation technique. In line 1 of message flow diagram 200, user agent client 102 sends a SIP register message to SIP entity 106 opening a pinhole in firewall/NAT 104. In line 2 of message flow diagram 200, SIP entity 106 forwards the registration message on behalf of the UAC 102 to registrar 108. In line 3 of message flow diagram 200, registrar 108 responds to the UAC 102 by sending a 200 OK message to SIP entity 106. As shown, the 200 OK message includes a registration duration value of 3600 seconds in the "expires" parameter in the Contact header field. In line 4 of message flow diagram 200, SIP entity 106 modifies the message and forwards the message to UAC 102. As shown, SIP entity 106 decreases the "expires" parameter value to 60 seconds in the modified message. As a result, in line 5 of message flow diagram 200, UAC 102 sends another register message after 60 seconds. In line 6 of message flow diagram 200, SIP entity 106 sends a 200 OK message with an "expires" parameter value of 60 seconds to UAC 102 without contacting registrar 108.

The technique or approach illustrated in FIG. 2 requires an SBC and or a SIP proxy to instruct each UAC to re-register at a frequency or interval that is shorter than the pinhole closure time-out period of the firewall that each UAC is behind. While this approach may preserve pinholes, it also has a number of drawbacks that make this technique less than ideal. For example, it is very difficult and impractical for a SIP proxy to determine or be aware of pinhole closure time-out periods of individual firewalls protecting the corresponding thousands or millions of UACs in a network. Another issue is the amount of generated traffic which is bandwidth resource intensive and processor resource intensive for SIP entities. Further, this technique requires the SBC and or SIP proxy to maintain registration state information for each UAC in order to determine which of the multitude of re-registration requests should trigger a re-registration action between the SIP entity and the SIP Registrar function and not just a 200 OK message from the SIP entity. Conventionally, this storing of state involves the entity storing much of the register message. As such, the entity would quickly use all of its memory resources and further back-up data replication would be tedious. That is, conventional storage of state information at SIP proxies does not scale well in large deployments.

Figure 3:
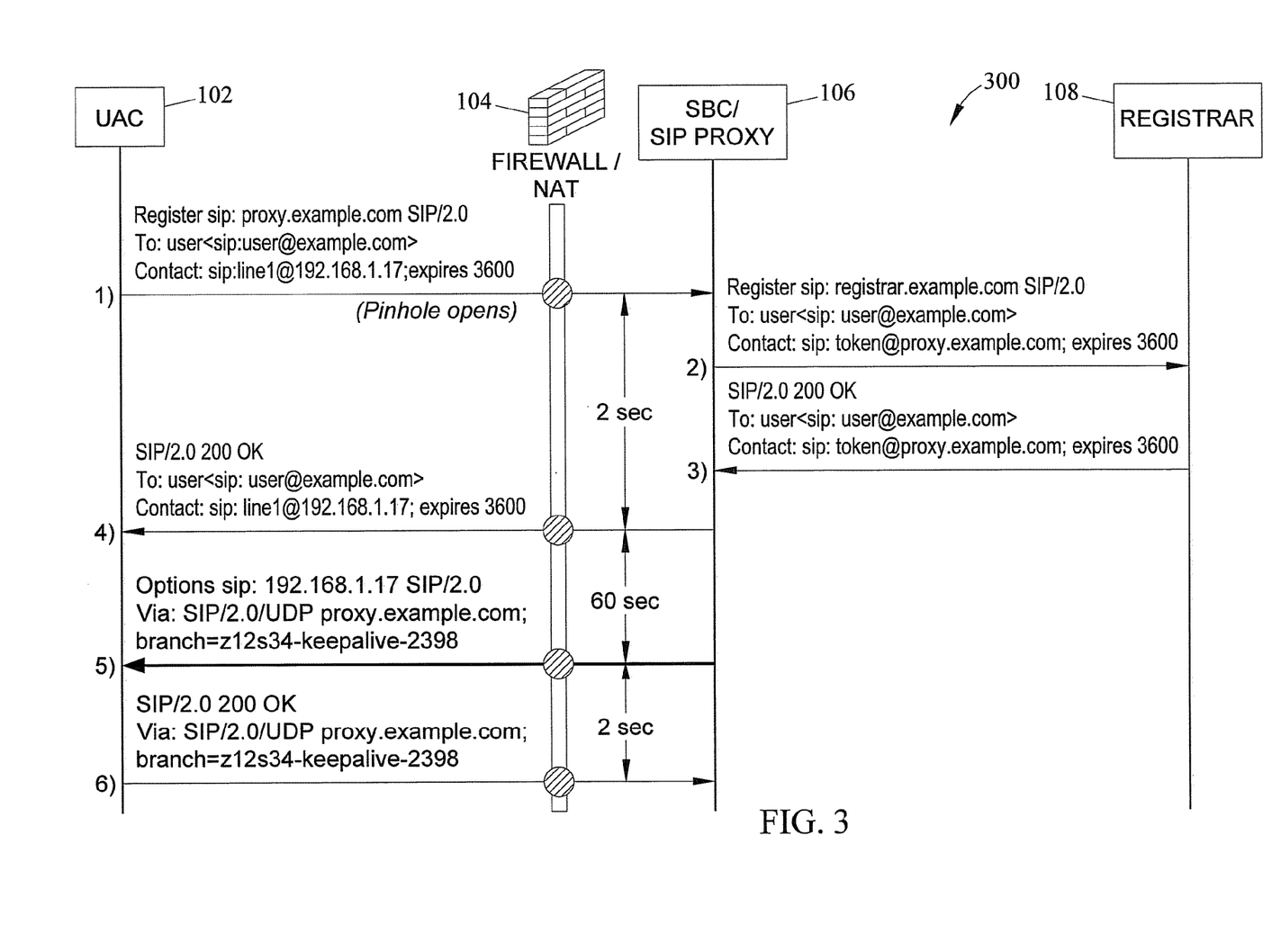
FIG. 3 is a message flow diagram illustrating pinhole preservation according to an embodiment of the subject matter described herein.

FIG. 3 is a message flow diagram 300 illustrating pinhole preservation according to an embodiment of the subject matter described herein. As shown, the registration process in lines 1-4 are the same as in lines 1-4 of FIGS. 1 and 2. In one embodiment, SIP entity 106 is configured to initiate a sequence of signaling transactions with UAC 102 for ensuring a pinhole opened or established by an initial register message is preserved (e.g., is not closed due to a "no-traffic" timeout). In one embodiment, the signaling transactions are initiated at a time interval sufficiently short for ensuring a response from UAC 102 is sent through firewall/NAT 104 preserving a pinhole. In line 5 of message flow diagram 300, SIP entity 106 generates and sends a SIP message to UAC 102. In line 6 of message flow diagram 300, UAC 102 sends a 200 OK message to SIP entity 106. In one embodiment, the SIP message and corresponding 200 OK message serve no other purposes other than to facilitate pinhole preservation.

In one embodiment, the SIP message generated by SIP entity 106 is a SIP Options message. The SIP Options message may contain a value that allows SIP entity 106 to easily determine that the message is associated with pinhole preservation. For example, the SIP Options message may include a branch parameter in the via header for such purposes. It will be appreciated that other SIP messages may also be used for pinhole preservation and may also include a branch parameter. For example, a SIP Info or Invite message may be used to provide similar functionality. In one embodiment, SIP entities including UACs, SBCs, SIP proxies, or other types of back-to-back user agents may be configured to perform pinhole preservation message discrimination using hardware, software, or a combination of hardware and software.

Figure 4:
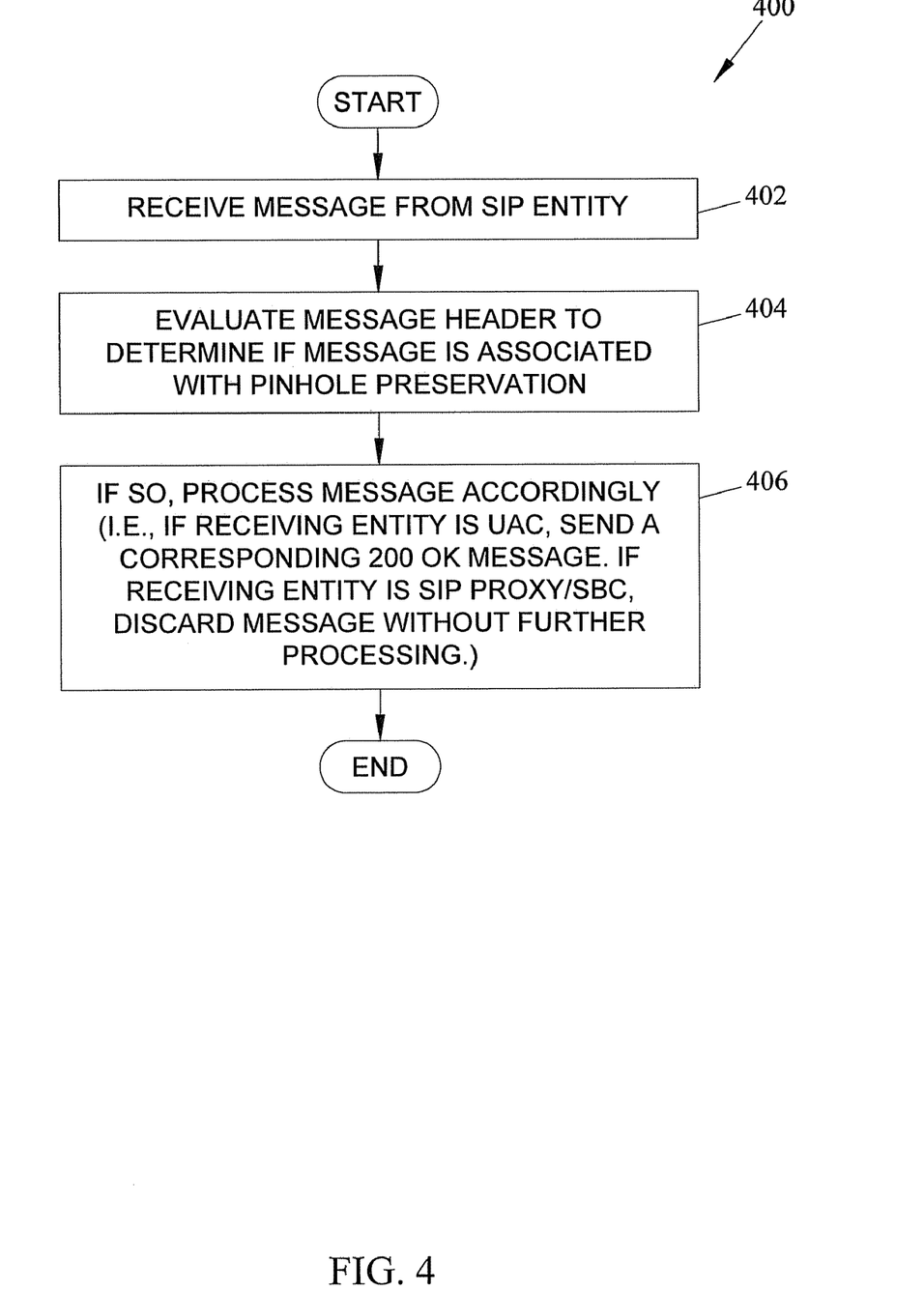
FIG. 4 is a flow diagram illustrating an exemplary method of processing SIP pinhole preservation messages header information according to an embodiment of the subject matter described herein.

FIG. 4 is a flow diagram illustrating an exemplary method 400 of processing SIP pinhole preservation messages header information according to an embodiment of the subject matter described herein. Method 400 may be implemented by UAC 102 in processing a message associated with pinhole preservation. In step 402, a SIP message is received from a SIP entity. In one embodiment, the SIP message includes a branch parameter for easily determining whether the message is associated with pinhole preservation including whether the message is solely for pinhole preservation purposes. In step 404, the SIP message header is evaluated for determining whether the message is associated with pinhole preservation. In step 406, if the message is determined to be associated with pinhole preservation, the message will be processed accordingly. For example, if the receiving SIP entity is UAC 102, UAC 102 may send a corresponding 200 OK message without determining or including other information typically included in responses to such SIP messages. For example, UAC 102 does not have to determine or include device capabilities in generating a response to the SIP Options message that is solely for pinhole preservation even though normal SIP Options messages (i.e., those not exclusively used for pinhole preservation) typically require such processing. Identifying the Options message as being solely associated with pinhole preservation simplifies processing by UAC 102.

In the proceeding paragraph, method 400 is described as being performed by UAC 102. However, method 400 may also occur at SIP entity 106. If a SIP message, such as the 200 OK message sent in response to the Options message, is received by SIP entity 106, the headers of the 200 OK message may be examined, and the SIP message may be determined to be solely for pinhole preservation. In response to a determination that the SIP message is solely for pinhole preservation, SIP entity 106 may discard message without processing the message further. The determination as to whether a received SIP message is associated with pinhole preservation may include examining the via header of the message for the branch parameter. In one implementation, SIP UAC 102 may include the branch parameter from the Options message in the via header of the 200 OK message sent in response to the Options message.

The header processing of the Options message or the 200 OK message may occur before a SIP transaction layer of a SIP processing stack. The SIP transaction layer is the layer that is responsible for processing SIP transactions and requires most of the processing resources in parsing a typical SIP message. Because pinhole preservation traffic can be processed in a manner that avoids processing at this layer, the processing impact of pinhole preservation traffic is reduced over that of the conventional SIP message processing.

Figure 5:
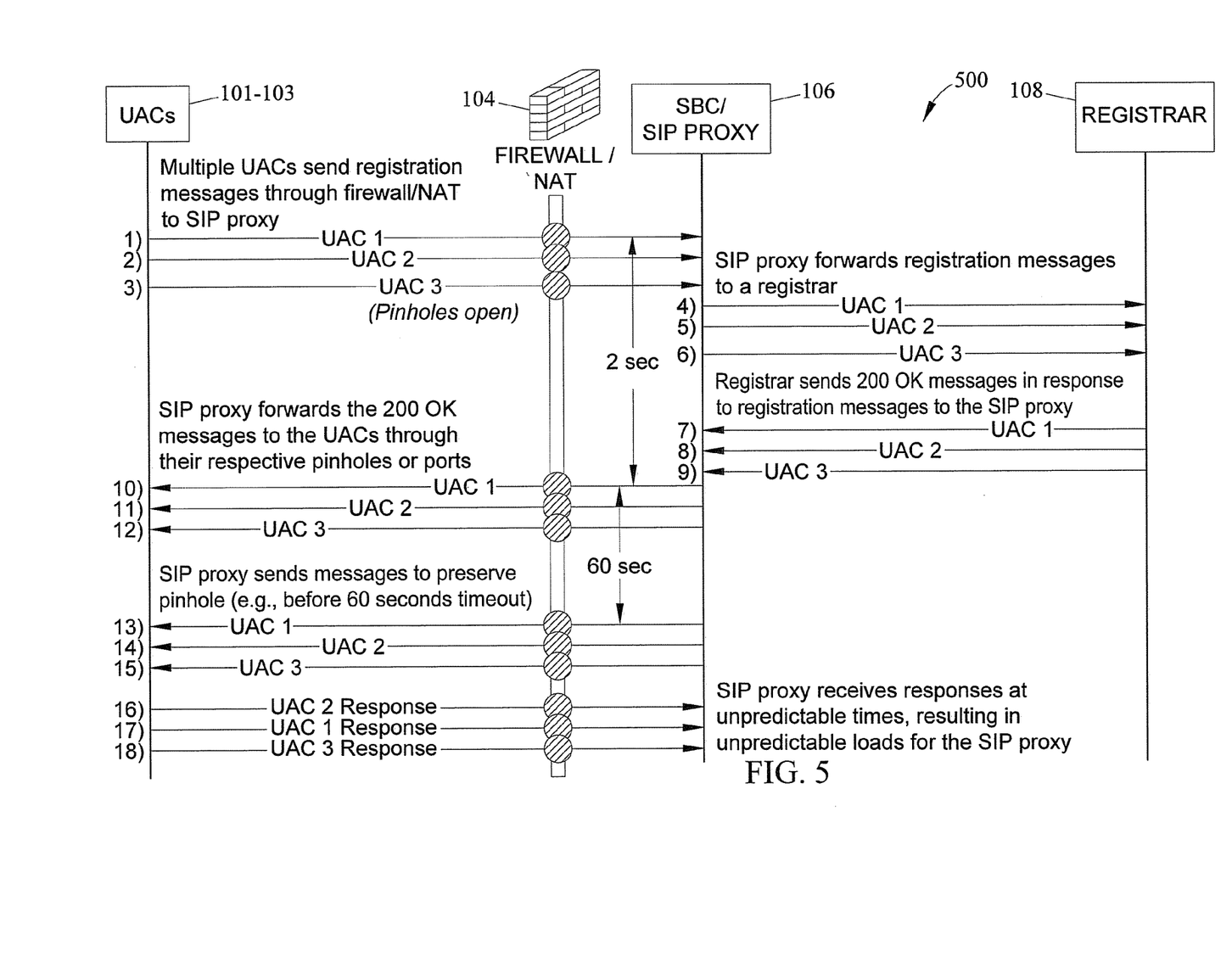
FIG. 5 is a message flow diagram illustrating pinhole preservation involving multiple UACs and accompanying message traffic according to an embodiment of the subject matter described herein.

The present subject matter may also provide benefits with regard to regulating pinhole preservation message traffic. FIG. 5 is a message flow diagram 500 illustrating pinhole preservation involving multiple UACs and accompanying message traffic according to an embodiment of the subject matter described herein. While FIG. 5 only depicts three UACs, it will be appreciated that FIG. 5 is for illustration and that a SIP entity may handle thousands or millions of UACs located behind a firewall/NAT.

Referring to lines 1-12 of message flow diagram 500, multiple UACs 101-103 located behind a firewall/NAT 104 register with a SIP registrar 108 using a SIP entity 106. In line 13-15 of message flow diagram 500, SIP entity 106 initiates SIP signaling transactions with UACs 101-103 to preserve their respective pinholes according to an embodiment of the present subject matter. The messages sent in line 13-15 may be spaced from each other at regular intervals to control the resulting flow of pinhole preservation traffic. In line 16-18 of message flow diagram 500, UACs 101-103 may send corresponding responses through firewall/NAT 104 to SIP entity 106 for preserving pinholes. Because the messages sent by SIP entity 106 to trigger pinhole preservation traffic are spaced from each other at regular intervals, the resulting responses are also spaced at substantially regular intervals, making the traffic load on SIP entity 106 more predictable.

Figure 6:
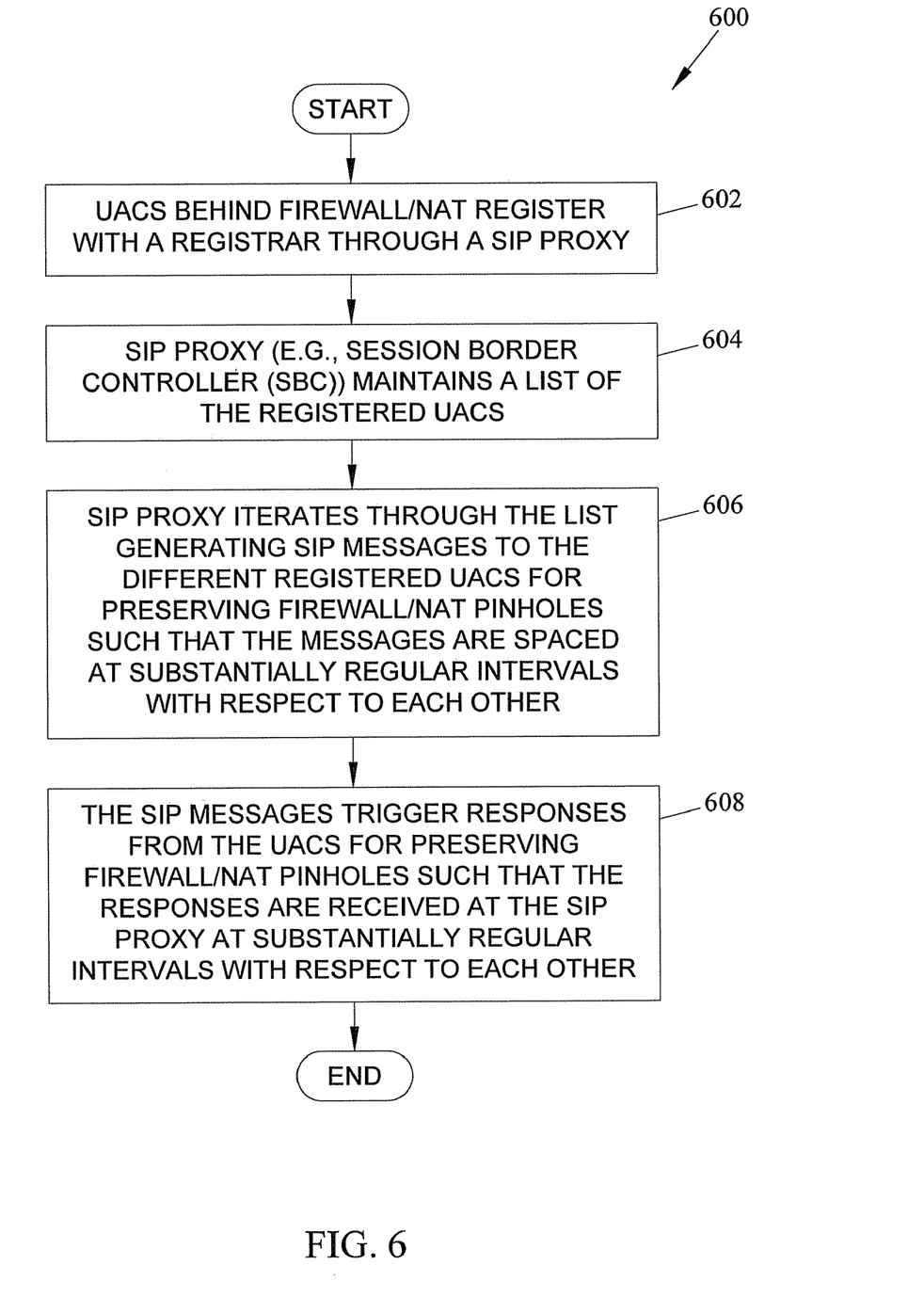
FIG. 6 is a flow diagram illustrating an exemplary method of regulating pinhole preservation message traffic according to an embodiment of the subject matter described herein.

FIG. 6 is a flow diagram 600 illustrating an exemplary method of regulating pinhole preservation message traffic according to an embodiment of the subject matter described herein. In step 602, a plurality of UACs 101-103 located behind a firewall/NAT 104 register with a SIP registrar 108 using SIP entity 106. In step 604, SIP entity 106 maintains a list of contact information for UACs 101-103 registering from behind firewall/NAT 104. In one embodiment, maintaining the list includes storing a minimum amount of state for each registration consisting of a source Internet protocol (IP) address and a port for each registration. In step 606, SIP entity 106 iterates through the list generating and sending SIP messages to the different registered UACs 101-103 such that the messages are spaced at substantially regular intervals with respect to each other. One way to achieve these substantially regular intervals or rate may include using an algorithm that divides a pinhole preservation time interval by a number of registered users to determine a spacing interval between pinhole preservation request messages. For example, if the total pinhole preservation time interval is 60 seconds and there are 120 users, the pinhole preservation time interval between request messages for each user may be 60/120 or 0.5 seconds. Alternatively, the number of registered users may be divided by the total pinhole preservation time interval to determine a rate at which pinhole preservation traffic is generated. Using the same example, if there are 120 users and a 60 second time interval, the rate for pinhole preservation traffic would be 120/60 or 2 pinhole preservation request messages sent per second.

In one embodiment, the SIP pinhole preservation request messages trigger substantially prompt responses from UACs 101-103. Hence, in addition to spreading the processing load of SIP entity 106 over a time interval, such messages may trigger responses with substantially regular (e.g., similarly spaced) intervals. In step 608, the SIP messages trigger responses from UACs 101-103 such that the responses are at substantially regular intervals with respect to each other.

Figure 7:
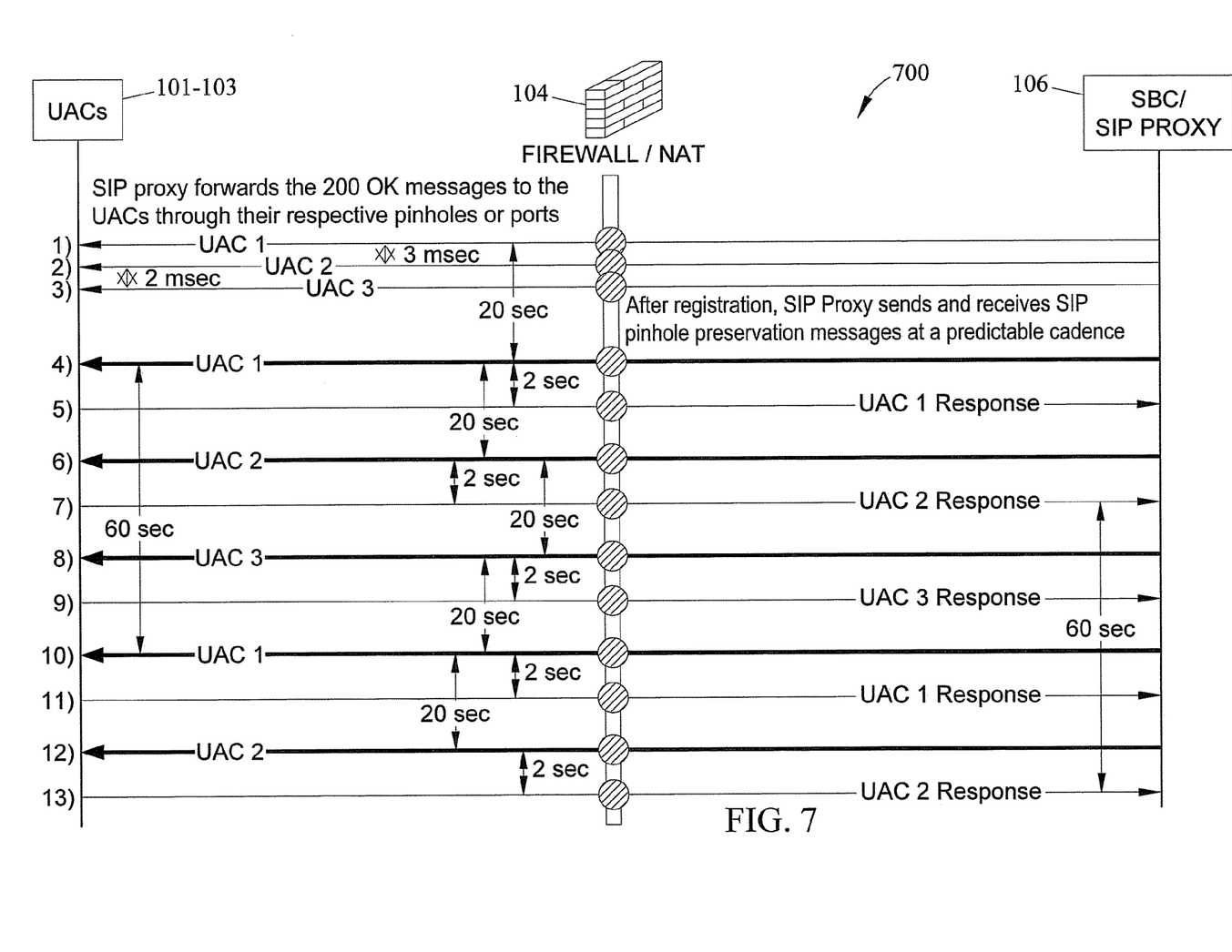
FIG. 7 is a flow diagram illustrating pinhole preservation message traffic regulation according to an embodiment of the subject matter described herein.

FIG. 7 is a message flow diagram 700 illustrating pinhole preservation message traffic regulation according to an embodiment of the subject matter described herein. In line 1-3 of message flow diagram 700, UACs 101-103 receives 200 OK messages, forwarded by SIP entity 106, indicating UACs 101-103 are registered by SIP registrar 108. After registration, SIP entity 106 may determine, using stored state information (e.g., a list of registered UACs 101-103), a rate or cadence at which to initiate SIP signaling transaction according to an embodiment of the present subject matter. For example, using the algorithm described above, three registered users and a 60 second time period results in 20 seconds between pinhole preservation request messages. In line 4, 6, 8, 10, and 12 of message flow diagram 700, SIP entity 106 initiates a signaling transaction by generating and sending a SIP message to one of the registered UACs every 20 seconds. In line 5, 7, 9, 11, and 13 of message flow diagram 700, in response to receiving a SIP message, each UAC sends a corresponding, similarly spaced (i.e., substantially regularly spaced) response. As shown, a response is received by SIP entity 106 every 20 seconds. Additionally, as shown, intervals between signaling transactions of SIP entity 106 and a given UAC is sufficiently short for ensuring pinhole preservation. For example, lines 4 and 10 show SIP messages for preserving pinhole of UAC 1 (i.e., UAC 101) as being sent every 60 seconds. Thus, if pinhole timeout occurs after 90 seconds such regular spacing ensures the pinhole will be preserved (e.g., pinhole will not close due to no-traffic).

Figure 8:
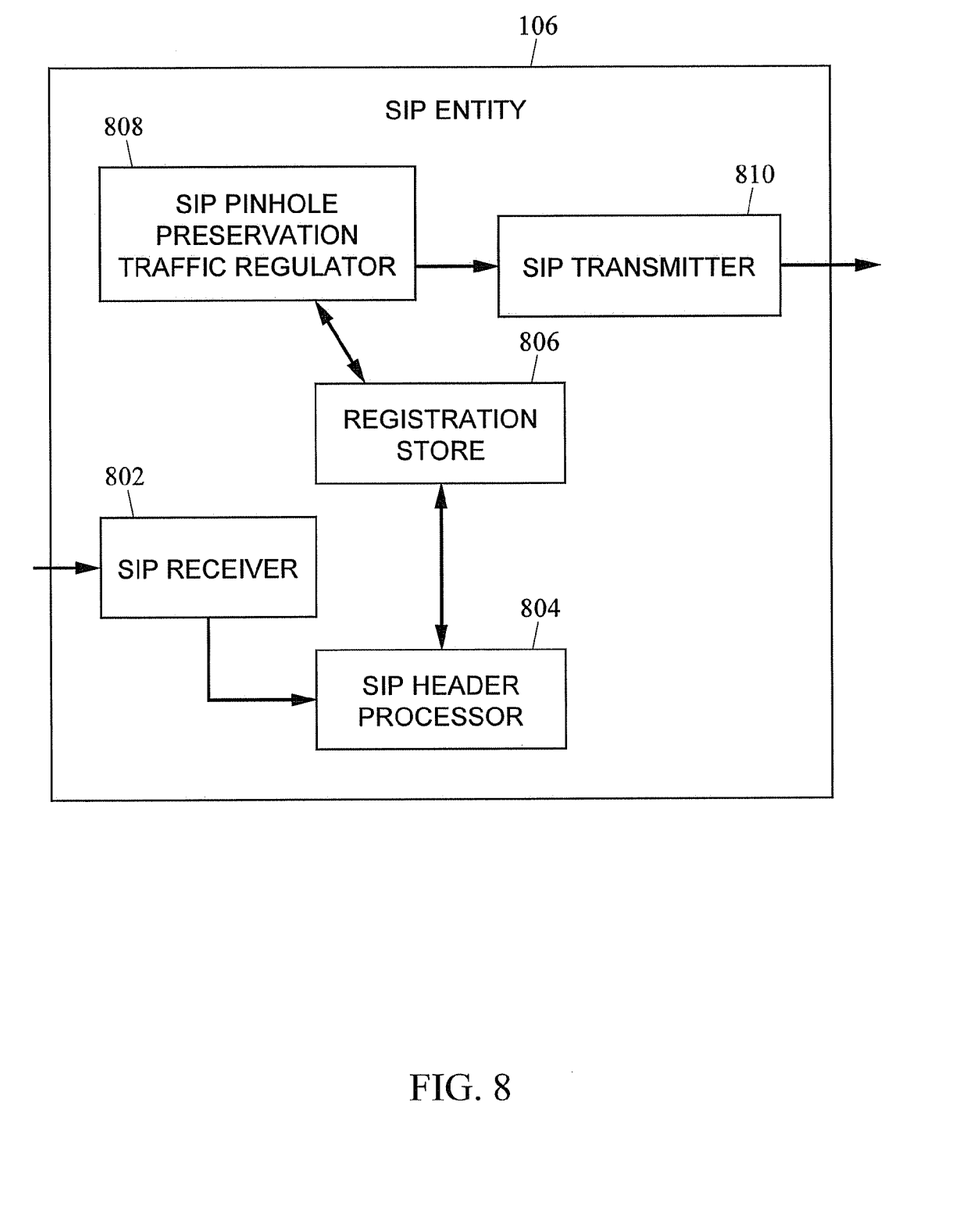
FIG. 8 is a block diagram illustrating an exemplary SIP entity according to an embodiment of the subject matter described herein.

FIG. 8 is a block diagram illustrating an exemplary SIP entity 106 that generates and regulates SIP pinhole preservation traffic according to an embodiment of the subject matter described herein. Referring to FIG. 8, SIP entity 106 may be any type SIP entity capable of sending or receiving SIP messages, including pinhole preservation messages. Thus, SIP entity 106 may include a SIP proxy, an SBC, or other type of back-to-back user agent. As shown, SIP entity 106 includes a SIP receiver 802, a SIP header processor 804, a registration store 806, a SIP pinhole preservation traffic regulator 808, and a SIP transmitter 810. SIP receiver 802 may be configured for receiving SIP messages including SIP routing information. SIP header processor 804 may be configured for evaluating header information of SIP messages and determining whether such messages are associated with pinhole preservation including determining whether the messages are solely for pinhole preservation. In one embodiment, SIP messages are received by SIP receiver 802 and sent to SIP header processor 804 before being sent to a SIP transaction layer processor where normal SIP messages (i.e., SIP messages not solely for pinhole preservation) are processed further. In one embodiment, SIP header processor 804 performs rapid discarding and rapid responding using a branch parameter according to a previously discussed embodiment. In one embodiment, SIP header processor 804 may interact with registration list 806.

Registration store 806 is maintained by SIP entity 106 for keeping information about registered UACs (e.g., UAC 101-103 of FIG. 7). In one embodiment, registration store 806 may include state information used for preserving pinholes. SIP pinhole preservation traffic regulator 808 regulates pinhole preservation message traffic. That is, regulator 808 is responsible for determining when to initiate signaling transactions for ensuring pinhole preservation. As such, regulator 808 may use the above-described algorithm to provide predictable, substantially regular intervals between SIP messages sent by SIP entity 106. In response to regulator 808 initiating SIP pinhole preservation request messages at substantially regular intervals, the resulting responses from the UACs may also occur at substantial regular intervals. In one embodiment, SIP pinhole preservation traffic regulator 808 may use registration store 806 in regulating pinhole preservation messages. For example, regulator 808 may use information in registration store 806 in generating a "branch" parameter of SIP message for use by the UACs quickly identifying a pinhole preservation message. Regulator 808 may also use information in registration store 806 in sending or initiating sending of SIP messages. SIP transmitter 810 may be configured for transmitting SIP messages according to a rate (i.e., interval) determined by regulator 808.

Figure 9:
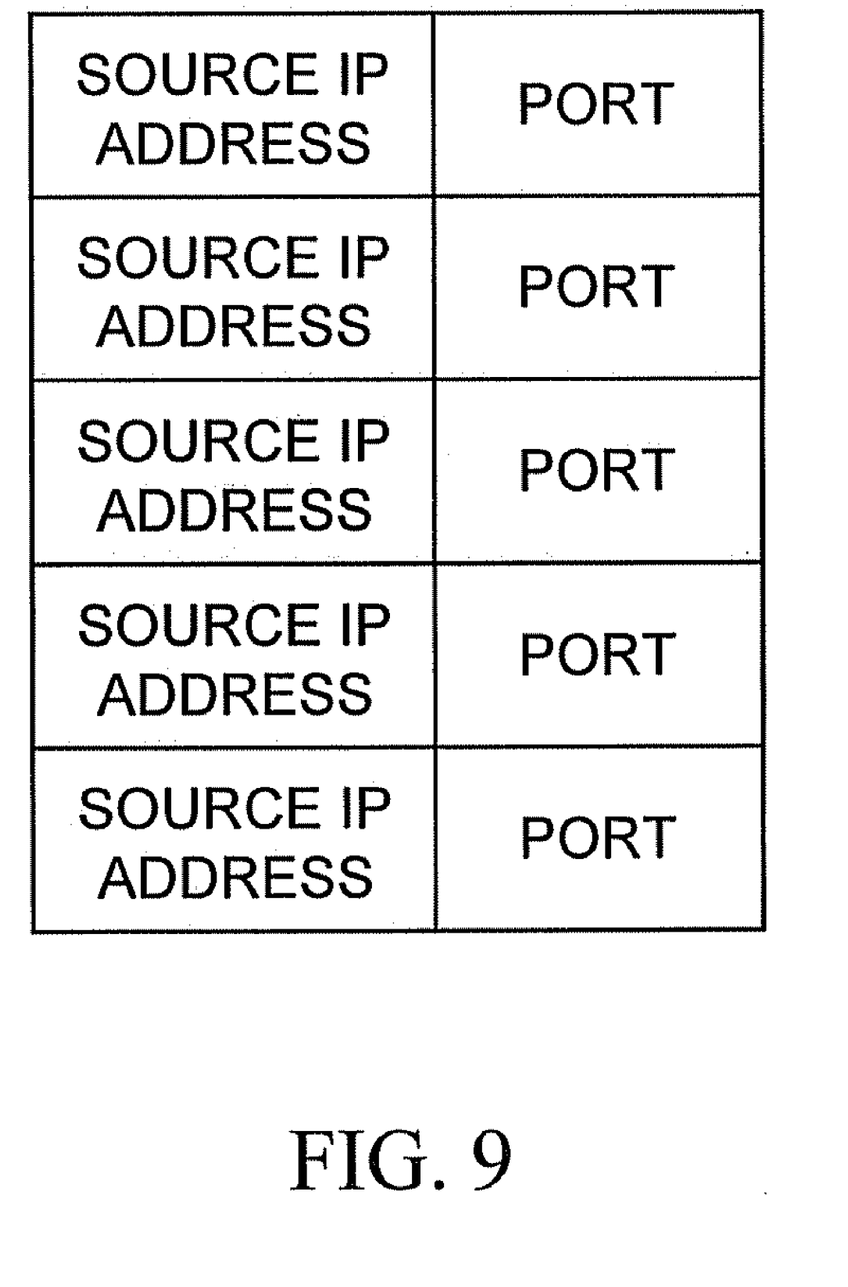
FIG. 9 is a block diagram illustrating an exemplary registration state list maintaining a minimum amount of state according to an embodiment of the subject matter described herein.

As previously mentioned, maintaining some state information about the registration status of UACs at a SIP entity may be necessary for pinhole preservation. By storing minimizing the required amount of state information stored for each registered UAC and by only sending state information once to a geographically diverse backup entity (e.g., when a UAC registers with a SIP registrar), the present subject matter allows efficient state replication between such SIP entities. FIG. 9 is a block diagram illustrating data that may be stored in registration store 806 for maintaining a minimum amount of state according to an embodiment of the subject matter described herein. As shown, the registration state list contains entries consisting of a source IP address of each UAC (e.g., UAC 102) and a port in which that UAC can be reached. In one embodiment, each entry includes only an IP address and port comprising 6 bytes of data for each UAC. In one embodiment, information in the registration state list is used by SIP entity 106 to send SIP pinhole preservation messages through pinholes of firewall/NAT 104 to UAC 102. Additional information, such as registration timeout or registration status is not required to be stored by SIP entity 106. As a result, geodiversity of SIP entity 106 can be more efficiently achieved.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for regulating network address translator (NAT) or firewall pinhole preservation traffic generated by a plurality of session initiation protocol (SIP) user agent clients (UACs) and sent towards a SIP entity located between the plurality of SIP UACs and a SIP registrar in a communications network, the method comprising:
at the SIP entity, comprising one of a SIP proxy or a session border controller (SBC) and including one or more processors:
maintaining a list of contact information for the plurality of SIP UACs registered with the SIP registrar, wherein the SIP UACs are behind at least one of a firewall and a NAT located between the SIP UACs and the SIP entity;
determining a regular time interval for sending SIP messages from the SIP entity to the SIP UACs based on a number of the plurality of SIP UACs registered behind the at least one of the firewall and the NAT and a firewall pinhole timeout interval;
iterating through the list of contact information to identify a corresponding SIP UAC and generating and sending a corresponding SIP message to the corresponding SIP UAC, wherein the SIP messages to the SIP UACs are separated by the regular time interval with respect to each other, wherein the SIP messages to the SIP UACs trigger SIP responses from the SIP UACs that are separated by the regular time interval with respect to each other.

2. The method of claim 1, wherein the step of maintaining a list of contact information includes storing a minimum amount of state consisting of a source Internet protocol (IP) address and a port for each SIP UAC.

3. The method of claim 1, wherein each of the SIP messages and each of the SIP responses include a header parameter associated with pinhole preservation, wherein the SIP responses are identified as including the header parameter and discarded at a SIP transaction layer in a SIP processing stack.

4. The method of claim 1, wherein the SIP messages sent to the SIP UACs comprise SIP Options messages.

5. The method of claim 1, wherein each of the SIP messages includes a branch parameter identifying the SIP message as being associated with pinhole preservation.

6. The method of claim 1, wherein the regular time interval is less than the firewall pinhole timeout interval.

7. The method of claim 2, further comprising: replicating the minimum amount of state for at least a portion of the list of contact information from the SIP entity to a geographically diverse standby SIP entity.

8. A system for regulating network address translator (NAT) or firewall pinhole preservation traffic generated by a plurality of session initiation protocol (SIP) user agent clients (UACs) and sent towards a SIP entity located between the plurality of SIP UACs and a SIP registrar in a communications network, the system comprising:
the SIP entity, comprising one of a SIP proxy or a session border controller (SBC), the SIP entity comprising:
a registration store memory for maintaining a list of contact information for the plurality of SIP UACs registered with the SIP registrar; wherein the SIP UACs are behind at least one of a firewall and a NAT located between the SIP UACs and the SIP entity; and
a SIP pinhole preservation traffic processor for determining a regular time interval for sending SIP messages from the SIP entity to the SIP UACs based on a number of the plurality of SIP UACs registered behind the at least one of the firewall and the NAT and a firewall pinhole timeout interval, iterating through the list of contact information to identify a corresponding SIP UAC and generating and sending a corresponding SIP message to the corresponding SIP UAC, wherein the SIP messages to the SIP UACs are separated by the regular time interval with respect to each other, wherein the SIP messages to the SIP UACs trigger SIP responses from the SIP UACs that are separated by the regular time interval with respect to each other.

9. The system of claim 8, wherein maintaining a list of contact information includes storing a minimum amount of state consisting of a source met protocol (IP) address and a port for each SIP UAC.

10. The system of claim 8, wherein each of the SIP messages and each of the SIP responses include a header parameter associated with pinhole preservation, wherein the SIP responses are identified as including the header parameter and discarded at a SIP transaction layer in a SIP processing stack.

11. The system of claim 8, wherein the SIP messages sent to the SIP UACs comprise SIP Options messages.

12. The system of claim 8, wherein each of the SIP messages includes a branch parameter identifying the SIP message as being associated with pinhole preservation.

13. The system of claim 9 comprising: replicating the minimum amount of state for at least a portion of the list of contact information from the SIP entity to a geographically diverse standby SIP proxy.

14. A non-transitory computer readable medium having stored thereon computer executable instructions for regulating network address translator (NAT) or firewall pinhole preservation traffic generated by a plurality of session initiation protocol (SIP) user agent clients (UACs) and sent towards a SIP entity located between the plurality of SIP UACs and a SIP registrar in a communications network; the computer executable instructions when executed by a processor of a computer perform steps comprising:
at the SIP entity, comprising one of a SIP proxy or a session border controller (SBC):
maintaining a list of contact information for the plurality of SIP UACs registered with the SIP registrar, wherein the SIP UACs are behind at least one of a firewall and a NAT located between the SIP UACs and the SIP entity;

determining a regular time interval for sending SIP messages from the SIP entity to the SIP UACs based on a number of the plurality of SIP UACs registered behind the at least one of the firewall and the NAT and a firewall pinhole timeout interval;

iterating through the list of contact information to identify a corresponding SIP UAC and generating and sending a corresponding SIP message to the corresponding SIP UAC, wherein the SIP messages to the SIP UACs are separated by the regular time interval with respect to each other, wherein the SIP messages to the SIP UACs trigger SIP responses from the SIP UACs that are separated by the regular time interval with respect to each other.

* * * * *